United States Patent [19]

Simpson et al.

[11] Patent Number: 4,858,167

[45] Date of Patent: Aug. 15, 1989

[54] PARALLEL BINARY ADDER HAVING GROUPED STAGES INCLUDING DYNAMIC LOGIC TO INCREASE CARRY PROPAGATION SPEED

[75] Inventors: Richard D. Simpson, Carlton; Derek Roskell, Wellingborough, both of United Kingdom

[73] Assignee: Texas Instruments Incorporated, Dallas, Tex.

[21] Appl. No.: 285,359

[22] Filed: Dec. 14, 1988

Related U.S. Application Data

[63] Continuation of Ser. No. 942,905, Dec. 17, 1986, abandoned.

[30] Foreign Application Priority Data

Dec. 20, 1985 [GB] United Kingdom ............... 85 31380

[51] Int. Cl.[4] ............................................... G06F 7/50
[52] U.S. Cl. .................................................... 364/787
[58] Field of Search ............................... 364/787, 786

[56] References Cited

U.S. PATENT DOCUMENTS

| | | | |
|---|---|---|---|
| 3,728,532 | 4/1973 | Pryor | 364/787 |
| 3,925,652 | 12/1975 | Miller | 364/787 |
| 4,425,623 | 1/1984 | Russell | 364/786 |
| 4,584,661 | 4/1986 | Grundland | 364/787 |
| 4,623,981 | 11/1986 | Wolrich et al. | 364/787 |
| 4,685,079 | 8/1987 | Armer | 364/786 |

OTHER PUBLICATIONS

Schmookler et al., "Group-Carry Generator", *IBM Tech. Disclosure Bulletin*, vol. 6, No. 1, Jun. 1963, pp. 77–78.

Williams, "Adder Architecture", *IBM Tech. Disclosure Bulletin*, vol. 23, No. 19, Mar. 1981, pp. 4587–4590.

"Pipelined Carry-Lookahead Adder for Fixed-Point Arithmetic", *IBM Tech. Disclosure Bulletin*, vol. 28, No. 9, Feb. 1986, pp. 4106–4108.

*Primary Examiner*—David H. Malzahn
*Attorney, Agent, or Firm*—William E. Hiller; N. Rhys Merrett; Melvin Sharp

[57] ABSTRACT

A binary adder circuit is described using dynamic transistor logic in which for high speed carry propagation the adder stages are grouped in pairs or larger numbers and additional dynamic logic means is provided in each group to control a single transistor connected in series in the carry propagation path over the group. The transistors used in the specific embodiments are MOS transistors, but some or all of these could be replaced by junction FET's or bipolar transistors.

3 Claims, 2 Drawing Sheets

PARALLEL BINARY ADDER HAVING GROUPED STAGES INCLUDING DYNAMIC LOGIC TO INCREASE CARRY PROPAGATION SPEED

This application is a Continuation, of application Ser. No. 942,905, filed Dec. 17, 1986, now abandoned.

This invention relates to a multi-stage parallel binary adder using semiconductor circuitry and having high speed carrying propagation.

In the search for higher operating speed for computing devices various proposals have been made to reduce the time needed to add two numbers together by increasing the rate of propagation of carry signals along the stages of a parallel adder. Many of these proposals have required complex logical circuitry which is expensive to construct in terms of semiconductor components. It is clearly desirable to construct components for computing devices in the form of integrated circuits so that they can be produced at relatively low cost and with high reliability. In order to include as many components as possible on an integrated circuit, it is advantageous to eliminate as far as possible the need for complicated logical devices such as have been proposed for certain carry chains whilst retaining the advantages of higher speed of carry propagation, bearing in mind that the chief cause of delay in computing circuitry lies in the response time of the gates and switches used.

It is an object of the present invention to provide an improved multi-stage parallel binary adder circuit which is particularly suited to manufacture as all or part of an integrated circuit.

According to the present invention there is provided a multi-stage parallel binary adder circuit having a carry path and in which each stage has a first output for a carry propagate signal and a second output for a carry generate signal and logic means are provided for each group of at least two successive stages for combining the carry propagate signals and the carry generate signals from the stages of the particular group to produce a group carry propagate output and a group carry generate output, wherein for each group of stages the carry path has a group carry input conductor for receiving the carry output from the immediately preceding group of stages and a group carry output conductor for conveying the carry output from the particular group to the immediately following group, a first transistor connecting the input conductor to a first reference voltage in response to a pre-charge clock signal prior to the generation of carry propagate signals and carry generate signals by the stages of the circuit, a second transistor responsive to the group carry propagate signal from the particular group to connect the group carry input conductor to the group carry output conductor for that group, and a third transistor responsive to the group carry generate signal from the particular group to connect the group carry output conductor to a second reference voltage.

The transistors may be MOS transistors.

The logic means and the adder stages may also be constructed from dynamic MOS circuits and the entire adder circuit may be formed as all or part of an integrated circuit.

A group of stages may consist of 2 stages and the circuit may include for each group of stages a fourth MOS transistor connected from the group carrying input conductor and responsive to the carry propagate signal from the first stage of the group to apply a carry input signal to the second stage of the group through an OR gate, the second input of which is connected to receive a carry generate signal from the first stage.

The carry and other signals may be positive or negative going as required with inverters included where necessary, and the conductivity types of the MOS transistor channels should be selected to suit the signal polarities.

In order that the invention may be fully understood and readily carried out into effect it will now be described with reference to the accompanying drawings, of which:

Figure 1:
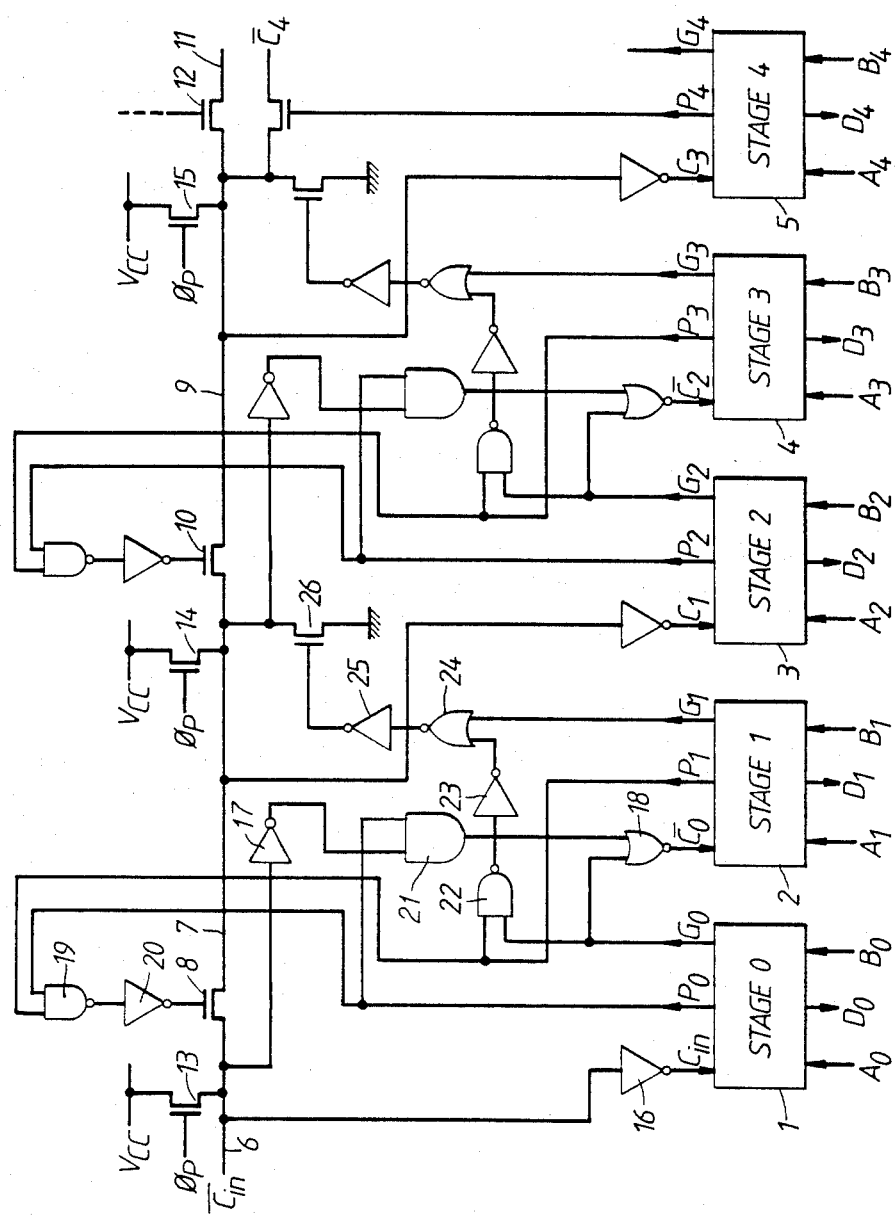
FIG. 1 is a diagram of part of an embodiment of the invention.

FIG. 1 shows five adding stages of a multi-stage parallel binary adder; the stages are represented by the blocks 1, 2, 3, 4 and 5 and have inputs for the respective bits of numbers A and B together with the carry from the preceding stage. Thus the block 2 represents stage 1 and has inputs A1 and B1 representing the digits of the numbers A and B and Co representing the carry from stage 0. Each stage produces in addition to the sum output D a cary propagate signal P and a carry generate signal G. An incoming carry Cin is applied in inverted form to a conductor 6 which forms the beginning of the carry propagate chain of the adder. The conductor 6 is connected to conductor 7 through a transistor 8 which in turn is connected to a conductor 9 through a transistor 10 which in turn is connected to a conductor 11 through a transistor 12. The conductors 6, 7 and 9 are connected to a voltage supply Vcc through transistors 13, 14 and 15 respectively, which transistors are rendered conducting by a precharge signal $\phi P$.

In the control of the propagation and generation of carries, the stages of the adder are grouped in pairs, stages 0 and 1 together, stages 2 and 3 together, stage 4 with stage 5, not shown, and so on. Sicne the circuits are the same for each pair of stages, only the circuit associated with stages 0 and 1 will be described. The incoming carry signal Cin is applied via an inverter 16 to the carry input of stage 0.

The conductor 6 is also connected to an input of inverter 17 whose output is connected to the input of AND gate 21. The carry propagate signal $P_0$ from stage 0 is also input to gate 21. The output of gate 21 is input to NOR gate 18 which also receives an input the carry generate signal $G_0$ from stage 0. The output from NOR gate 18 represents the inverted carry signal $\overline{C}_O$ from stage 0. $P_a$ from stage 0 and $P_1$ from stage 1 are applied as inputs to NAND gate 19, the output of which controls transistor 8 connecting conductors 6 and 7 of the carry propagate chain of the adder circuit. the carry generate signal $G_0$ from stage 0 and the carry propagate signal $P_1$ from stage 1 are applied as inputs to NAND gate 22 whose output is applied as input to inverter 23. The output of inverter 23 and the carry generate signal $G_1$, from stage 1 are applied as inputs to NOR gate 24 whose output controls transistor 26 through inverter 25. Conductor 7 is connected to ground voltage through transistor 26 and to the input of the logic circuit combining the carry generate and carry propagate signals of the next series of stages.

The circuitry just described performs the logical operations to combine the carry propagate and carry generate signals from the stages 0 and 1 so that a signal representing the inverted carry from the stage 1 is correctly produced with the only delay imposed on the propagation of a carry input applied in inverted form to the conductor 6 is that due to the transistor 8. The form of logic used in the carry shown is known as dynamic MOS logic and operates by the precharging of the conductors 6, 7, 9, etc. to the voltage Vcc by the precharge signal $\phi P$. A carry is represented by the discharge of the appropriate conductor to earth, the conductor 6 being discharged by means not shown although the input is represented by Cin. The transistor 26 serves to discharge the conductor 7 if the transistor 8 does not conduct, this being the situation if the stages 0 and 1 product a carry output although they may not necessarily propagate a carry from the conductor 6. If both stages 0 and 1 produce a carry propagate signal, that is to say both P0 and P1 are present, then the NAND gate 19 will respond and cause the inverter 10 to apply a signal to the transistor 8 to cause it to conduct so that any inverted carry input signals will discharge the conductor 7. Stages 0 and 1 together will produce a carry output regardless of the input if either the stage 1 produces a carry generate signal G1 or stage 0 produces a carry generate signal G0 and stage 1 produces a carry propagate signal P1. In the latter case, the gate 22 reacts and applies the signal to the gate 24 and in the former case the signal G1 is applied directly to the gate 24. When either of these is present, the gate 24 reacts and causes the inverter 25 to switch on the transistor 26 and discharge the conductor 7.

Incoming carriers to stage 0 can be derived from the conductor 6 only and are fed to the stage through the inverter 16. Incoming carriers to stage 1 can be derived from the conductor 6 if stage 0 is producing a carry propagate signal $P_0$.

Figure 2:
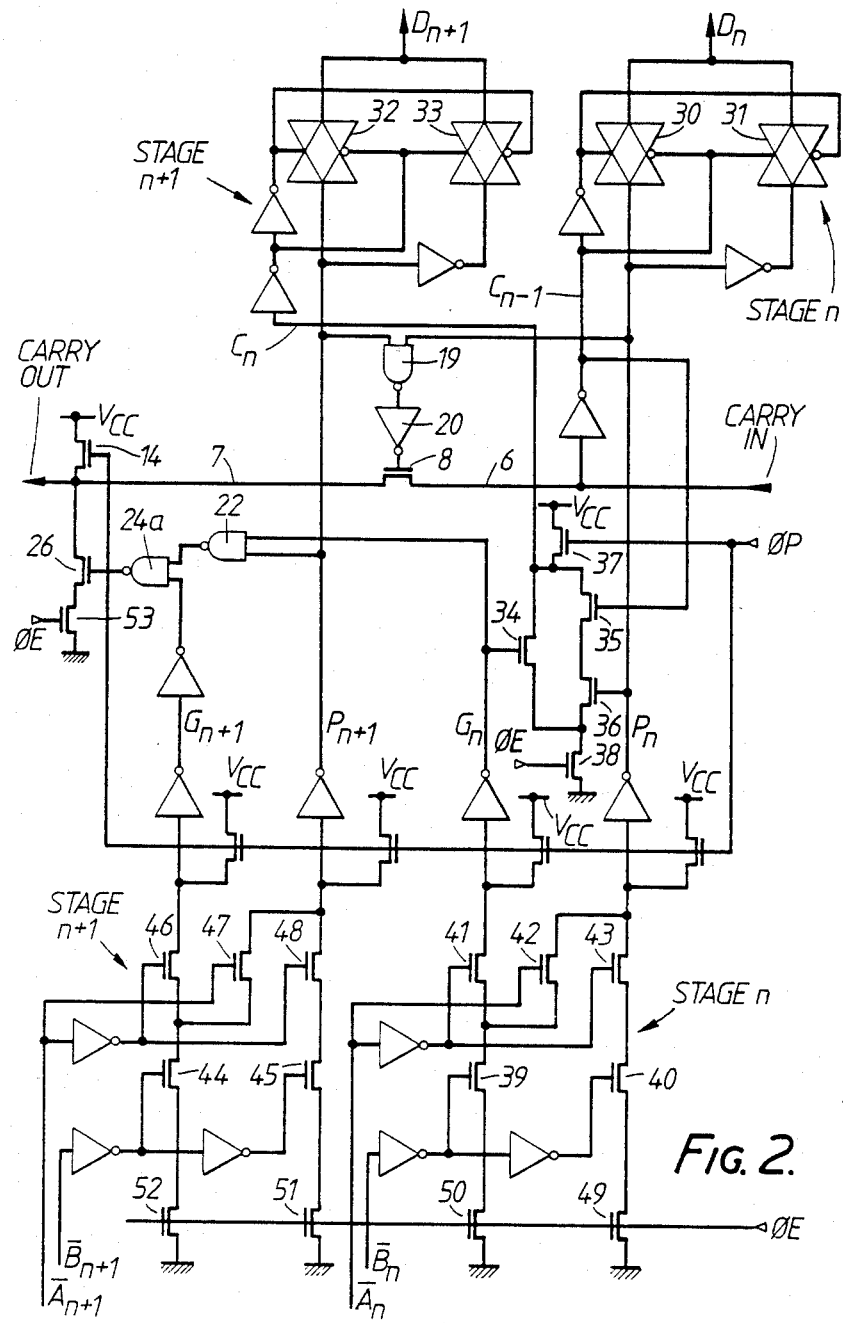
FIG. 2 shows a part of FIG. 1 in more detail.

FIG. 2 shows in greater detail the construction of a pair of stages of the adder shown in FIG. 1 using dynamic MOS logic. As far as possible the same reference notation is used in FIG. 2 as was used in FIG. 1 and components corresponding to those just described with reference to FIG. 1 have the same references as in that figure. It should be noted that whereas in FIG. 1 the stage numbers increase from left to right with the carry being propagated in the same direction, in FIG. 2 the stage numbers increase and the carry propagation takes place from right to left. Another point of dissimilarity between FIGS. 1 and 2 is that in FIG. 2 each adding stage is in two parts, the stage n consisting of the transistors 39 to 43 and the transmission gates 30 and 31. A transmission gate consists of an N-channel MOSFET and a P-channel MOSFET connected in parallel with appropriate signals applied to their gates so that they are turned off and on together; such a gate has the advantage that it produces substantially no attenuation of the logic signal levels.

Considering the stage n of the adder, the transistors 39 to 43 together with the associated inverters function as a half adder in response to inverted input digits $\overline{An}$ and $\overline{Bn}$ to produce a carry propagate signal Pn and a carry generate signal Gn. The signal Pn is applied to the inputs of the transmission gates 30 and 31, through an inverter in the case of the gate 31 and these gates are controlled by a carry signal Cn−1 derived by inverting the signal on the conductor 6. The output of the transmission gates 30 and 31 forms the sum signal Dn of the stage n. The stage n+1 is of similar construction to the stage n and produces a carry propagate signal Pn+1 and a carry generate signal Gn+1. As in FIG. 1, the carry propagate signals Pn and Pn+1 control the transistor 8 by combination in a NAND gate 19 the output of which is inverted by the inverter 20. Carry generate signals Gn and Gn+1 are combined by a logic arrangement which differs slightly from that shown in FIG. 1 in that the NOR gate 24 of FIG. 1 is replaced by a NAND gate 24A because the inverters 23 and 25 are omitted, and the carry generate signal Gn+1 is inverted before application to the gate 24A. The production of the carry input to the stage n+1, the signal Cn, is achieved by transistors 34, 35 and 36 and its logical combination with the carry input to the stage n, Cn−1, is provided by the transistor 35 which is connected in series with the transistor 36. The alternative source of the signal Cn which is the carry generate signal Gn from the stage n is provided by the transistor 34 which is connected in parallel with the series combination of transistors 35 and 36.

The precharge clock signal $\phi P$ is used in FIG. 2 in the same way as in FIG. 1 and also to enable the functioning of the logical circuitry of the adding stages. An evaluate clock $\phi E$ is employed in FIG. 2 to enable the selective discharge of the conductors precharged by the precharge clock in response to the logical combination of signals applied to the transistors of the circuits involved. The precharge clock $\phi P$ and the evaluate clock $\phi E$ are applied altenately to their respective connections.

From a consideration of the circuits described above with reference to FIGS. 1 and 2, it will be apparent that the carry chain includes only a single series connected transistor for every two stages of the adder so that the propagation delay of the carry signal along the carry chain will be about half of what it would be for a conventional carry chain having a transistor for each stage of the adder. The invention therefore provides a significant increase in the speed of operation of a parallel adder for only a small increase in the complexity of the carry propagation and generation circuitry.

The carry propagate and carry generate signals from groups of more than two stages could be combined logically, but the logic circuitry would be much more complicated than that described above, and the additional saving in propagation time along the carry chain due to the reduction in the number of series transistors would be offset to some extent by the extra delay imposed on the generation of the control signals for those transistors by the more complicated logic circuitry.

Although the invention has been described with reference to embodiments using dynamic MOS logic some or all of the MOS transistors could be replaced by junction FET's or bipolar transistors. Bipolar transistors have different characteristics from MOS transistors and their use in place of MOS transistors in the circuits described above may enhance the performance of the circuits in certain applications. Moreover the chip area needed to accommodate a circuit can be reduced if certain of the transistors are bipolar ones.

What we claim is:

1. A parallel binary adder circuit comprising:
 a plurality of adder circuit stages coupled to a carry path, each of said stages including a first logic circuit for producing a carry propagate signal and a second logic circuit for producing a carry generate signal;
 a third logic circuit for each group of two successive stages, no two groups containing the same stage, for combining the carry propogate signals and the carry generate signals from the stages of a particular group to produce a group carry propagate signal and a group carry generate signal, wherein for each group of stages the carry path has a group carry input conductor for receiving a group carry output signal from an immediately preceding group of stages and a group carry output conductor for conveying the group carry output signal from the particular group to the immediately following group;

a first transistor connecting the input conductor to a first reference voltage in response to a pre-charge clock signal prior to the generation of the carry propagate and the carry generate signals;

a second transistor responsive to the group carry propagate signal from the particular group to connect the group carry output conductor to the group carry input conductor for the particular group; and a third transistor responsible to the group carry generate signal from the particular group to connect the group carry output conductor to a second reference voltage.

2. A parallel binary adder circuit according to claim 1 wherein the transistors are MOS transistors.

3. A parallel binary adder circuit according to claim 1 wherein the third logic circuit includes:

an inverter coupled to the carry path to receive an input signal to the carry path of the adder circuit and having an output;

an AND gate receiving an input the output of the inverter and the carry propagate signal from a first stage of the group and having an output; and a NOR gate receiving as inputs the output of the AND gate and the carry generate signal from the first stage of the group.

* * * * *